United States Patent Office 3,193,395
Patented July 6, 1965

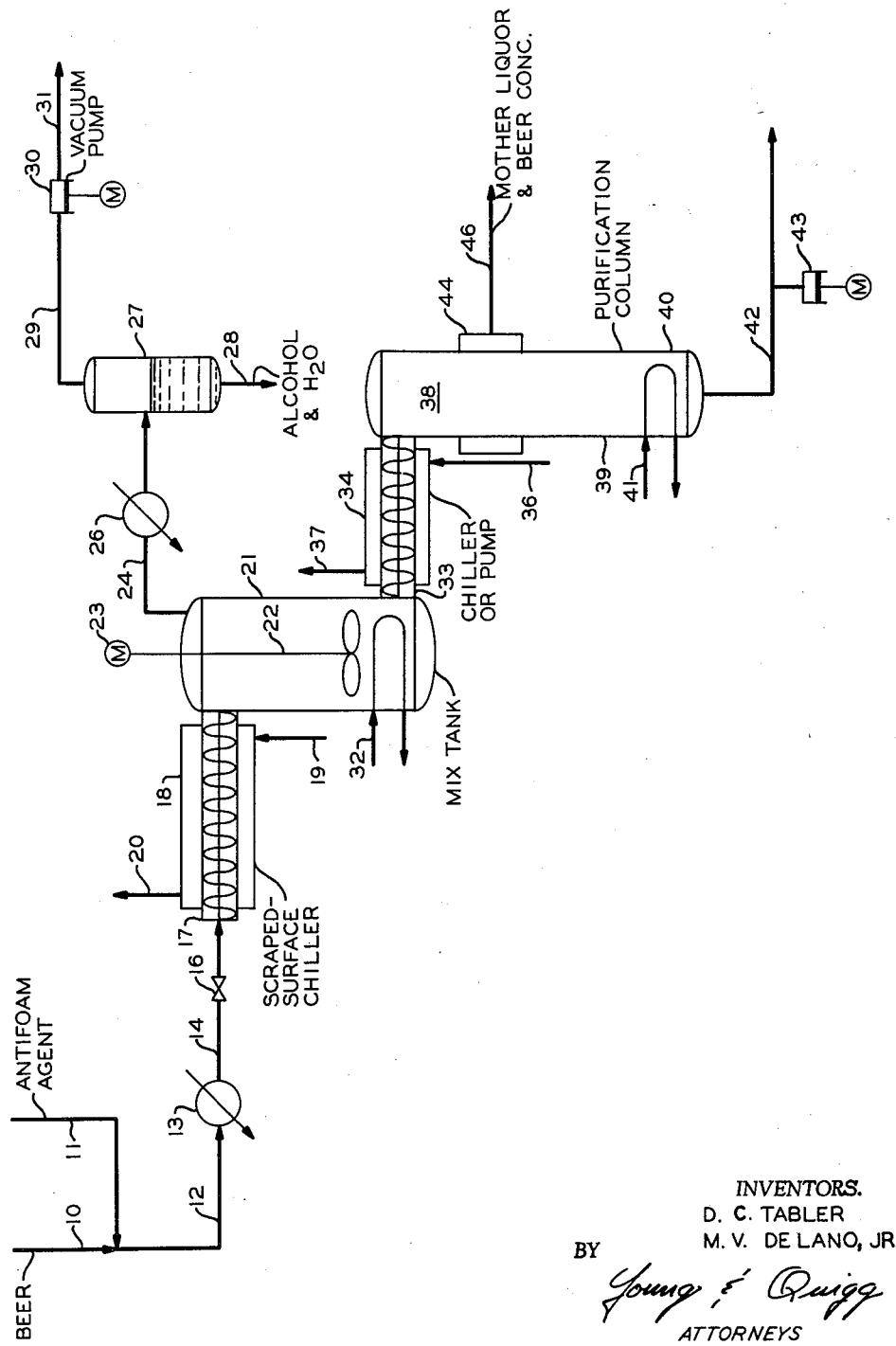

3,193,395
CONCENTRATION OF BEER BY CRYSTALLIZATION
Donald C. Tabler and Merritt V. De Lano, Jr., Bartlesville, Okla., assignors to Phillips Petroleum Company, a corporation of Delaware
Filed May 4, 1962, Ser. No. 192,507
5 Claims. (Cl. 99—199)

This invention relates to a method of concentrating beer by crystallization. In another aspect it relates to a method of concentrating beer using a crystal purification column such as that disclosed in the U.S. Patents to Schmidt, Re. 23,810, or Thomas, 2,854,494.

It is common to concentrate aqueous solutions by evaporation of water for the sake of economy in storage and shipping and to preserve the product. Removal of water by evaporation from a food product and particularly from a beverage results in the removal of essential components which affect the freshness and flavor of the beverage so that it cannot be restored to its original quality merely by the addition of water. This disadvantage can be overcome in the concentration of beverages by using a crystallization process whereby the water is separated from nonaqueous components by freezing. It is known that when water freezes the ice is in a pure form so that water can be removed from aqueous solutions by this method without the loss of volatile materials essential to the quality thereof.

There is considerable interest in the concentration of beer by freezing. The beer as received from the fermenters can be concentrated to approximately ¼ its original volume by freezing out much of the water present therein. If the beer is shipped in the concentrated form, considerable savings can be realized in freight. Also, the storage facilities for the beer concentrate can be reduced and it has been found that beer in the concentrated form can be stored for susbtantially longer periods of time without deterioration of flavor. Even if the beer is immediately reconstituted, there is substantial advantage to the concentration process in employing the crystallization method since the cold beer concentrate can be filtered to produce in effect an accelerated lagering process. This greatly reduces the requirements for large inventories and refrigerated storage tanks now necessary in breweries.

In the above-mentioned patent to Thomas, 2,854,494, there is disclosed a process and apparatus for purifying crystals which involves moving a mixture of crystals and mother liquor through a purification column in which the crystals are passed in a compact mass into a body of crystal melt which is displaced back into the crystal mass. The purification column includes an upstream liquid removal zone, a middle reflux zone, and a downstream melting zone. Mother liquor is removed from the crystals in the liquid removal zone and the ice crystals are melted in the melting zone. A portion of the crystal melt is withdrawn from the melting zone and the remainder is forced back into the crystal mass in the reflux zone.

This apparatus can be used very effectively in the freeze concentration of beer. The beer is cooled to form a slurry of ice crystal in a mother liquor which is a beer concentrate and the resulting slurry is passed into the crystal purification column. Substantially pure water water which is the crystal melt can be removed from the melting zone and the beer concentrate is removed from the liquid removal zone of the purification column. We have found, however, that in the application of this purification method to beer, considerable difficulty is encountered as a result of carbon dioxide evolving from the mother liquor in the purification column. This evolvement of carbon dioxide causes channeling within the crystal mass with resultant loss of efficiency of the purification column. It becomes apparent, therefore, that the removal of carbon dioxide from the beer prior to its introduction into the crystal purification column should provide a solution to this problem. It can be appreciated, however, that with the removal of carbon dioxide from the beer prior to concentration there is also a substantial danger of removing alcohol and some of the essential flavor components which the crystal concentration method is used to preserve.

According to our invention, beer is concentrated by the crystallization method employing a purification column as described and the problem of channeling within the purification column as a result of evolvement of carbon dioxide is overcome by the prior removal of carbon dioxide without any substantial removal of the essential components from the beer itself. Since carbon dioxide is always added to beer in a carbonation step prior to packaging, this prior removal of carbon dioxide from the beer before concentration does not pose any particular problem or introduce an additional step in the over-all process of treating the beer concentrate on reconstitution. According to our invention, an antifoam agent is first added to the beer as it comes from the fermenters. The beer is then cooled in order to freeze a substantial amount of the water present therein and form a relatively thick slurry. This slurry is then subjected to a vacuum and the slurry is agitated with the result that carbon dioxide is removed from the remaining liquid. The solids content of the slurry can then be adjusted if necessary for the concentration process and the slurry is passed into the purification column where the ice and mother liquor are separated as described above. In a preferred aspect of the invention, in the carbon dioxide removal step the beer is cooled so that the slurry has a high solids content and subsequently the slurry is warmed slightly and thereby thinned so that trapped bubbles of carbon dioxide are released. The slurry is then recooled to the proper solids content for passage to the purification column. By lowering the temperature of the beer in order to remove carbon dioxide so that a substantial amount of water is frozen, the solubility of the carbon dioxide in the over-all slurry is reduced even though the reduced temperature permits higher solubility in the remaining liquid. Reducing the pressure permits substantially all of the carbon dioxide to be removed from the slurry and since the alcohol has a very low vapor pressure at the low temperatures employed, very little of this material is vaporized with the carbon dioxide. We have also found that the addition of the antifoam agent to the beer prior to cooling to form a slurry enables substantially complete removal of the carbon dioxide from the slurry whereas complete removal is not attained without this antifoam agent, apparently because of the formation of extremely fine bubbles of the gas within the crystal mass.

It is an object of our invention to provide an improved method of concentrating beer by crystallization. Another object is to provide a method of concentrating beer by using a crystal purification column. Still another object of our invention is to provide a method of removing carbon dioxide from beer prior to concentration of the crystal slurry of the beer in the purification column without removing substantial amounts of alcohol. Still another object is to provide a method of improving the efficiency of a crystal purification column in the concentration of beer by substantially complete removal of the carbon dioxide present in the beer prior to passage of the crystal slurry through the purification column. Other objects, advantages, and features of our invention will be apparent to those skilled in the art from the following discussion and drawing which is a schematic flow diagram illustrating the carbon dioxide removal and the crystal purification steps of our invention.

As beer comes from the fermenters in the brewing process, it contains approximately 1 to 2 volumes of carbon dioxide (60° F. and 1 atm.) per volume of liquid. Most of the carbon dioxide which has been generated in the fermentation step passes off from the liquid and is collected, stored, and ultimately reused for the carbonation of the beer prior to bottling. Finished beer ordinarily has about 2.5 to 2.7 volumes of carbon dioxide dissolved in each volume of liquid beer. When concentrating beer by the freezing method, the beer containing dissolved carbon dioxide from fermentation is cooled in order to form a slurry of ice crystals in the beer concentrate. Although the solubility of carbon dioxide in the liquid present increases as a result of the reduced temperature, since the ice which is formed is in a substantially pure state the net result is reduced solubility of the gas in the total slurry so that carbon dioxide is evolved. This natural evolvement of carbon dioxide is not sufficient, however, to prevent the problem of channeling which occurs later when the crystal slurry is fed to the purification column. According to our invention, certain deliberate steps must be taken to further the removal of carbon dioxide so that it will be substantially complete prior to passing the slurry into the purification column. To further explain our carbon dioxide removal process reference is now made to the drawing.

The first step of the process is the addition of an antifoam agent to the beer as it comes from the fermenters. As illustrated in the drawing, beer in conduit 10 has injected into it an antifoam agent passing through conduit 11. The antifoam agent which is used for this purpose belongs to a class of organo-silicon polymers which are represented by the following empirical formula;

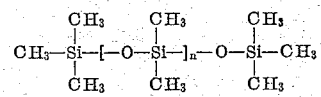

where $n$ is an integer resulting in a compound having a viscosity of at least 40 centistokes, and preferably at least 100 centistokes at 25° C. These polymers can be classed as polydimethylsiloxanes. These componds are colorless, odorless, inert liquids which vary in viscosity upwardly from about 1 centistoke at 25° C. to about a million centistokes. They are available commercially under such trade names as "DC 200 Fluids" and "DC Antifoam A." These are a well known class of antifoam agents and have been described in a patent to John Fetchin, U.S. 2,750,435.

The antifoam agent is added to the beer in an amount in the range of 10 to 200 parts per million. The beer containing the antifoam agent in conduit 12 then passes into precooler 13 where the beer is cooled until ice crystals begin to form. The precooled beer is then passed through conduit 14 and pressure reducing valve 16. Pressure reducing valve 16 is placed in the system early enough that the beer slurry is still very fluid and passes easily through the valve. Precooler 13 also relieves some of the cooling load from the scraped surface chiller 17 into which the precooled beer passes. A refrigerant is passed through the jacket 18 of the scraped surface chiller 17, entering and leaving through conduits 19 and 20, respectively.

In chiller 17 the beer is cooled to form a relatively thick slurry. The solids content of the slurry should be at least 20 weight percent and the slurry can be cooled until it is almost dry, for example, as high as 75 weight percent solids. The slurry is generally cooled until the solids content is greater than 25 weight percent and in the most preferred method of operation using a scraped surface chiller a thick slurry having a solids content in the range of 35 to 50 weight percent is formed. In order to provide a slurry within the range that is indicated, temperatures in the range of about 10 to 30° F. are necessary. The thick slurry is then passed from chiller 17 into mix tank 21. While scraped surface chillers are preferred for efficient continuous operation, any conventional freezing equipment which produces relatively fine ice particles can be used.

The slurry in mix tank 21 is stirred by agitator 22 driven by motor 23. The design of the agitator depends upon the solids content of the slurry. When the slurry is of the consistency of dry snow, a tumbling action is desired in order to expose as much crystal surface as possible to the vapor space within the mix tank. As a result of the cooling and ice formation carbon dioxide is evolved in chiller 17 and in mix tank 21 and is withdrawn through conduit 24. Because of the low temperature within the mix tank very little alcohol is evaporated but that which is vaporized can be recovered by passing the vapors through condenser 26 and collecting the condensate in receiver 27. Alcohol and water are then removed from the liquid phase in receiver 277 through conduit 28 and added to the beer concentrate. Carbon dioxide is removed from receiver 27 through conduit 29 passing through vacuum pump 30 and then through conduit 31 to carbon dioxide storage facilities. Vacuum pump 30 is operated so that the pressure within mix tank 21 is generally within the range of 1 to 10 pounds per square inch absolute. It is preferred to operate the mix tank at a pressure of about 3 to 7 pounds per square inch absolute.

In order to provide better agitation and movement of the slurry in the mix tank, a means 32 for heating the slurry, such as a steam coil or resistance wire, is provided in the lower portion of the tank. While this step is not always necessary, excellent removal of carbon dioxide can be obtained by freezing the beer to a high solids content, for example, in the range of about 35 to 50 weight percent, and then warming the slurry in the lower portion of the mix tank to a solids content of about 20 to 40 weight percent, preferably 35 to 40 weight percent. This slight thinning of the slurry enables additional release of trapped carbon dioxide bubbles. It is feasible at this point to completely melt the slurry to insure complete removal of carbon dioxide but such drastic action is seldom necessary and, of course, adds additional expense since the slurry must be refrozen before passage to the purification column. Ordinarily warming the slurry to about 26° F. provides a slurry having a solids content of about 35 weight percent which can be satisfactorily agitated and moved from the mix tank into the second chiller 33. Chiller 33 is also equipped with a jacket 34 through which refrigerant is circulated by way of conduits 36 and 37. This additional refrigeration is necessary only when the solids content of the slurry leaving mix tank 21 is below that desired for passage into purification column 38. Where the solids content is already at the desired value merely a pump or other conveyor is used for passing the slurry from the mix tank into the purification column.

Purification column 38 is an elongated vessel or chamber through which the slurry of ice crystals in mother liquor beer concentrate is forced by a pump or an auger in chiller 33. The ice crystals are forced in a compact mass through reflux zone 39 and are melted in melt zone 40 by heating means 41, for example, a steam coil or a resistance heater. The crystal melt is substantially pure water which ultimately is withdrawn from the purification column through conduit 42. Part of the water is displaced back into the crystal mass in reflux zone 39. This displacing action which results in efficient separation of mother liquor from the ice crystals is brought about by the combination of forces induced by the auger in chiller 33 and the pulse pump 43. A pulse column of this type is described in greater detail in the U.S. patent to R. W. Thomas, 2,854,494. Alternatively, a piston type column such as that described in the reissue patent to Schmidt, cited above, can be used.

Beer concentrate is withdrawn as a mother liquor through a filter from liquid removal zone 44 and passed by way of conduit 46 to storage or subsequent processing. Oridinarily the freeze concentration steps are repeated one or more times in order to obtain the desired concentration of beer. For example, if the solids content of the slurry passing into the purification column is 50 weight percent, the mother liquor concentrate has a volume about ½ that of the beer coming from the fermenters. To obtain a concentrate having a volume approximately ¼ of the fermented beer, a second freeze concentration step with a slurry formation of 50 weight percent solids is required. Ordinarily the slurry which is passed through the purification column has a solids content of about 25 to about 50 weight percent, preferably 30 to 40 weight percent. While it is desirable to concentrate the beer as much as possible in each step by forming crystal solids, if the solids content is too high the slurry becomes quite stiff and flows with difficulty from the chiller. Subsequent purification steps include the combination of chiller and purification column as shown in units 33 and 38 of the drawing. In many cases the chiller and purification column are in a single unit but have been shown as separate units in the drawing for simplicity of illustration. Of course, once the carbon dioxide has been removed, additional crystallization stages can be employed without difficulty. The beer concentrate of the desired water content is then filtered and stored or carbonated and reconstituted by the addition of the proper amount of water thereto. Ordinarily, the beer is filtered again after reconstitution and prior to bottling. Such filtration is conventional in the brewing process. Diatomaceous earth is normally used in this filtration step and as a result the antifoam agent which was added to assist carbon dioxide removal is removed from the beer product.

The time required for removal of carbon dioxide from the beer depends upon the size of equipment used and the efficiency of the agitation within mix tank 21. It should be expected, however, that anywhere from 1 to 2 hours would be required from the time the beer is passed into chiller 17 until it reaches the purification column. The mix tank should be sized accordingly to permit appropriate residence time.

To illustrate our invention further the following example is presented. In this example the conditions and proportions are typical only and should not be construed to limit our invention unduly.

*Example*

Beer direct from fermentation is concentrated to 25 weight percent of its original weight using the system as illustrated in the drawing with one additional stage of crystallization and purification. Referring to the figures as indicated in the drawing, 50 parts per million of DC Antifoam A is added to the beer as it comes from the fermenters and the resulting beer is cooled to approximately 30° F. in a refrigeration step. Precooled beer is then passed through a pressure reducing valve and into a scraped surface chiller where the beer is cooled to about 20° F. A slurry containing about 50 weight percent solids is formed. As the ice crystals are formed, carbon dioxide is evolved from the remaining mother liquor and the slurry is passed into a mix vessel where more time is allowed for the removal of the carbon dioxide. The ice crystals are tumbled in the mix vessel and are warmed slightly in the lower portion thereof to a solids content of 35 weight percent. Substantially all of the carbon dioxide is removed from the beer slurry in the mix tank and a slurry of 35 weight percent solids is passed into a second scraped surface chiller where further cooling is effected to raise the solids content of the slurry to 37 weight percent.

The carbon dioxide is removed overhead from the mix tank and passed through an alcohol trap and evacuated through a pump which reduces the pressure within the mix tank to about 5 pounds per square inch absolute. The slurry containing 37 weight percent solids is passed from the second chiller into a purification column where separation of the ice crystals and the mother liquor is effected. The ice crystals are melted and withdrawn as water from the bottom of the column and a beer concentrate is withdrawn as mother liquor from the liquid removal zone of the column.

This mother liquor is passed to a third chiller where cooling is brought about to produce a slurry of 37 weight percent solids. This slurry is passed through a second purification zone wherein the separation of ice crystals and mother liquor is repeated. The separated mother liquor is again cooled in a fourth chiller to form a slurry containing 37 weight percent solids and the ice and beer concentrate are separated in a third purification column. The withdrawn beer concentrate is about ¼ the weight and volume of the beer from the fermenters and retains all of the essential components. This concentrate contains about 13.75 weight percent alcohol and is substantially free of carbon dioxide. The concentrated beer is filtered through diatomaceous earth whereby substantially all of the antifoam agent is removed.

As will be apparent to those skilled in the art, various modifications can be made in our invention without departing from the spirit or scope thereof.

We claim:
1. A process for concentrating beer as it comes from the fermenters which comprises injecting into said beer from 10 to 200 parts per million of a liquid polydimethylsiloxane antifoam agent, cooling the beer containing the antifoam agent to form a crystal slurry of ice in a mother liquor beer concentrate, the solids content of said slurry being in the range of 20 to 75 weight percent, subjecting said slurry with agitation to sub-atmospheric pressure in the range of about 1 to 10 p.s.i.a. thereby inducing removal of substantially all of the carbon dioxide from said slurry, passing said slurry having a solids content in the range of about 20 to 50 weight percent into a confined zone wherein said ice crystals are passed in a compact mass into a body of crystal melt formed by melting said ice crystals in a downstream portion of said zone while melt is displaced into said crystal mass and mother liquor is withdrawn as a concentrated solution from an upstream portion of said zone.

2. In a process in which beer is concentrated by cooling said beer to form a slurry of ice crystals in mother liquor and said crystals and mother liquor are introduced into a confined zone wherein said ice crystals are passed in a compact mass into a body of crystal melt formed by melting said ice crystals in a downstream portion of said zone while melt is displaced into said crystal mass and mother liquor is withdrawn as a concentrated solution from an upstream portion of said zone, the improvement whereby channeling within said confined zone is avoided which comprises (1) introducing into said beer as it comes from the fermenters from 10 to 200 parts per million of a liquid polydimethylsiloxane having the formula

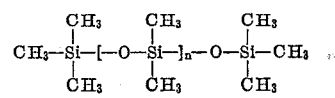

wherein $n$ is an integer resulting in the compound having a viscosity of at least 40 centistokes at 25° C., (2) cooling said beer containing said siloxane to form a slurry of ice crystals in mother liquor, said slurry having a solids content in the range of about 35 to 50 weight percent, (3) agitating the resulting ice crystals while subjecting said slurry to a reduced pressure in the range of 3 to 7 p.s.i.a. in a mixing zone, (4) warming the slurry sufficiently to convert the slurry to a solids content in the range of about 20 to 40 weight percent, (5) agitating the thus warmed slurry thereby releasing trapped bubbles of carbon dioxide therefrom, (6) withdrawing carbon dioxide from said mixing zone, (7) adjusting the solids content of said slurry through further cooling to a value of 25 to 50 weight percent, (8) and passing the resulting slurry substantially free of carbon dioxide into said confined zone.

3. The method of claim 2 wherein carbon dioxide withdrawn from said mixing zone is passed through a cooler and liquid separation vessel to effect removal of alcohol and water vapors accompanying the withdrawn carbon dioxide.

4. The process of claim 2 wherein said beer to which the siloxane has been added is precooled to the point at which ice crystals begin to form and the resulting cooled beer is then passed through a pressure reducing valve into a refrigeration zone wherein said initial slurry is formed under conditions of reduced pressure in the range of 3 to 7 p.s.i.a.

5. A process for concentrating beer which comprises adding to the beer from 10 to 200 parts per million of polydimethylsiloxane antifoam agent, cooling the beer to form a slurry containing at least 20 weight percent ice crystal solids, agitating said slurry under a pressure of about 1 to 10 p.s.i.a., whereby carbon dioxide is evolved from said slurry, and passing the beer thus treated as a crystal slurry into a purification column wherein a compact mass of crystals is passed through a confined zone into a body of crystal melt formed by melting said crystals in a downstream zone while melt is displaced into said crystal mass and mother liquor is withdrawn as a concentrated solution from an upstream portion of said confined zone.

References Cited by the Examiner

UNITED STATES PATENTS

| | | | |
|---|---|---|---|
| 2,190,689 | 2/40 | Torrington | 195—107 X |
| 2,383,547 | 8/45 | Hamill et al. | 55—52 |
| 2,523,245 | 9/50 | Coppock | 195—107 |
| 2,854,494 | 9/58 | Thomas | 99—205 X |

LOUIS MONACELL, *Primary Examiner.*

ABRAHAM H. WINKELSTEIN, *Examiner.*